United States Patent
Benboujema et al.

(10) Patent No.: US 10,207,632 B2
(45) Date of Patent: Feb. 19, 2019

(54) VEHICLE BODY ELEMENT COMPRISING A TRANSLUCENT BODY AND METHOD FOR PRODUCING SUCH A BODY

(71) Applicants: FAURECIA BLOC AVENT, Nanterre (FR); FAURECIA EXTERIORS GMBH, Stadthagen (DE); FAURECIA KUNSTSTOFFE AUTOMOBILSYSTEME GMBH, Stadthagen (DE)

(72) Inventors: Chawki Benboujema, Montbeliard (FR); Frederick Bois, Strasbourg (FR); Thorsten Leudts, Onasbruck (DE)

(73) Assignees: Flex-N-Gate France, Paris (FR); Plastic Omnium Automotive Exteriors GmbH, München, Allemagne (DE); Flex-N-Gate Germany GmbH, Neuburg, Allemagne (DE)

( * ) Notice: Subject to any disclaimer, the term of this patent is extended or adjusted under 35 U.S.C. 154(b) by 0 days.

(21) Appl. No.: 15/538,136

(22) PCT Filed: Dec. 21, 2015

(86) PCT No.: PCT/EP2015/080794
§ 371 (c)(1),
(2) Date: Jun. 20, 2017

(87) PCT Pub. No.: WO2016/102468
PCT Pub. Date: Jun. 30, 2016

(65) Prior Publication Data
US 2017/0368986 A1    Dec. 28, 2017

(30) Foreign Application Priority Data
Dec. 22, 2014    (EP) .................................... 14307133

(51) Int. Cl.
*B60Q 1/26*    (2006.01)
*F21V 9/08*    (2018.01)
(Continued)

(52) U.S. Cl.
CPC ............. *B60Q 1/2619* (2013.01); *B60Q 1/26* (2013.01); *B60Q 1/2661* (2013.01); *F21S 43/00* (2018.01);
(Continued)

(58) Field of Classification Search
CPC ....... B60Q 1/2619; B60Q 1/2661; F21V 9/08; F21S 8/10
See application file for complete search history.

(56) References Cited

U.S. PATENT DOCUMENTS 5,353,154 A    10/1994    Lutz et al.
7,985,008 B2    7/2011    Kaisser et al.
(Continued)

FOREIGN PATENT DOCUMENTS

DE    102012003200 A1    8/2013

OTHER PUBLICATIONS

Extended European Search Report for EP application No. 14307133, dated May 19, 2015, 7 pages.
(Continued)

*Primary Examiner* — William N Harris
(74) *Attorney, Agent, or Firm* — Reising Ethington P.C.

(57) ABSTRACT

Vehicle body element including:
 a translucent body (20),
 a holder body (22) intended to sustain the translucent body (20) to the vehicle, forming an enclosure (32), and
 a light system (24) extending in the enclosure (32), adapted to diffuse light through the translucent body (20).

Figure 1:
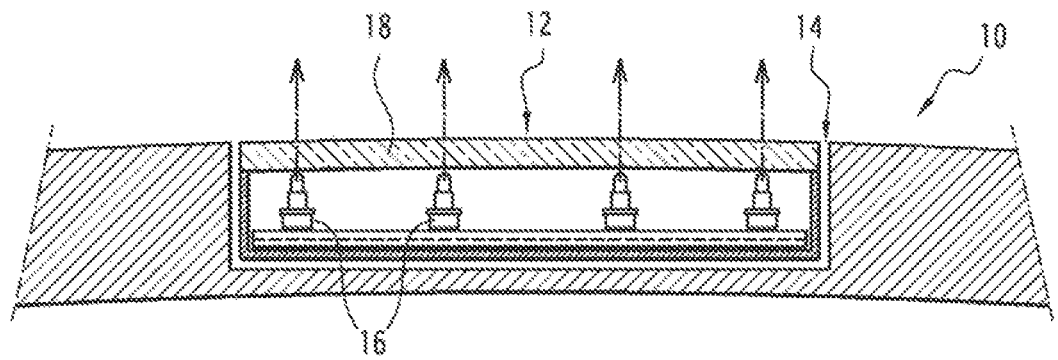

The translucent body (20) has a constant thickness and is made of a partially opaque material being arranged to let the light emitted by the light system (24) pass through the translucent body (20) when the light system (24) is turned on, the partially opaque material having a light transmittance (Continued)

chosen so that the quantity of natural light passing through the translucent body (20), reflecting on the light system (24) and passing back through the translucent body (20) is sufficiently low to blank the light system (24) when the light system (24) is switched off.

11 Claims, 2 Drawing Sheets

(51) Int. Cl.
*F21S 43/00* (2018.01)
*F21S 43/14* (2018.01)
*F21S 43/20* (2018.01)
*F21S 43/237* (2018.01)
*F21S 43/245* (2018.01)
*F21S 43/249* (2018.01)

(52) U.S. Cl.
CPC ............ *F21S 43/14* (2018.01); *F21S 43/237* (2018.01); *F21S 43/245* (2018.01); *F21S 43/249* (2018.01); *F21S 43/26* (2018.01); *F21V 9/08* (2013.01)

(56) References Cited

U.S. PATENT DOCUMENTS

| | | | | |
|---|---|---|---|---|
| 9,016,910 | B2* | 4/2015 | Bingle | B60R 13/005 |
| | | | | 362/459 |
| 9,821,708 | B2* | 11/2017 | Salter | B60Q 1/2696 |
| 2002/0101738 | A1* | 8/2002 | Misaras | B60K 37/06 |
| | | | | 362/487 |
| 2009/0257241 | A1* | 10/2009 | Meinke | B60Q 1/2669 |
| | | | | 362/546 |
| 2010/0321946 | A1 | 12/2010 | Dingman et al. | |
| 2011/0002138 | A1* | 1/2011 | Hayes | B29C 45/1671 |
| | | | | 362/551 |
| 2011/0063864 | A1* | 3/2011 | Brown | F21S 48/1731 |
| | | | | 362/509 |
| 2013/0215631 | A1* | 8/2013 | Micollier | B60Q 1/00 |
| | | | | 362/487 |

OTHER PUBLICATIONS

International Search Report for International application No. PCT/EP2015/080794, dated Mar. 3, 2016, 4 pages.
Written Opinion for International application No. PCT/EP2015/080794, dated Mar. 3, 2016, 6 pages.

* cited by examiner

VEHICLE BODY ELEMENT COMPRISING A TRANSLUCENT BODY AND METHOD FOR PRODUCING SUCH A BODY

The present invention relates to a vehicle body element comprising:
- a translucent body having an outer face intended to be turned towards the outside of the vehicle and an inner face intended to be turned towards the inside of the vehicle,
- a holder body intended to sustain the translucent body to the vehicle, forming an enclosure between the holder body and the translucent body, and
- a light system extending in the enclosure, adapted to diffuse light through the translucent body.

The invention also relates a method for producing such a body element.

In order to improve the visibility from outside of the vehicle, it is known to provide luminous elements arranged to illuminate the body of the vehicle. These luminous elements are for example formed by a light system arranged in a spoiler opening, or a tailgate opening, or along the door openings, etc. The light systems of such luminous elements are arranged in openings provided in body elements or between body elements and are directly visible from outside of the vehicle, such as stop lights or other lights.

Therefore, the vehicle visibility is improved when the light system is turned on, but these light system remain visible from outside of the vehicle when the light system is turned off, which negatively impacts on the appearance of the vehicle.

Nevertheless, such body elements exist, having an outer face which can be illuminated without the light system being visible from outside of the vehicle when the light system is turned off.

It is also known that such body elements present a multi-coating layer element to fulfil such attribute. These body elements require multistep processes for their manufacture. These processes generally involve the injection-moulding of a substrate, followed by galvanisation of the substrate in several chemical baths. A further known process consists of film-insert moulding. A coated film is trimmed, formed and then injection-moulded. The resulting product is opaque.

One of the goals of the invention is to overcome the above-mentioned drawbacks by proposing a body element blanking the light system from outside of the vehicle when it is turned off, without any coating layer made of opaque material on the outer face of the body element.

To this end, the invention relates to a body element of the afore-mentioned type, characterized in that the translucent body has a constant thickness and the translucent body is made of a partially opaque material being arranged to let the light emitted by the light system pass through the translucent body when the light system is turned on, the partially opaque material having a light transmittance chosen so that the quantity of natural light passing through the translucent body, reflecting on the light system and passing back through the translucent body is sufficiently low to blank the light system when the light system is switched off.

The light system is hidden by the body element and is therefore not directly visible from outside of the vehicle. Furthermore, the partially opaque translucent element prevents natural light from reaching the light system, when said light system is tuned off. Consequently, the appearance of the vehicle is not negatively impacted when the light system is turned off and is improved when it is turned on. Furthermore, the invention offers a greater liberty in the arrangement of the light systems, said light systems not needing to be arranged in specific openings or places between the body elements. Their manufacture is simplified.

According to other features of the body element according to the invention;
- the translucent body is made of thermoplastic material comprising a colored pigment, the quantity of pigment being chosen for reaching a determined light transmittance,
- the translucent body has a light transmittance ranged from 10% to 60% of visible light spectra ranged from 400 nm to 800 nm, preferably a light transmittance equal to 30%,
- the translucent body is integrally molded by injection,
- the translucent body is made of an single layer made of a thermoplastic material, loaded with pigments, without any light-scattering surface layer coated thereon, for modifying the light transmittance of at least a part of the translucent body facing the light system,
- the determined light transmittance is only reached by adjusting the quantity of pigments into the thermoplastic material,
- the thermoplastic material is made of one or more translucent thermoplastic materials, such as polymethyl methacrylate (PMMA), polycarbonate (PC), polymethyl methacrylate-acrylonitrile-styrene-acrylate terpolymer (PMMA-ASA) or other or a mix of these materials,
- the light system comprises at least one light guide or one light source,
- the light system has a light output between 1 to 1000 cd,
- the light system is designed to emit the light towards a determined direction, so that the light crosses directly the translucent body, along the said direction without being significantly deviated,
- a covering body extending in part on the outer face of the translucent body, so as to form a coherent extension body with the vehicle,
- the covering body is located to cover parts where the concentration of natural light is the highest, the covering body shape forming a shadow area.

The invention also relates to a method for producing a body element as described above, the method comprising the following steps:
- providing a translucent body, the translucent body having an outer face intended to be turned towards the outside of the vehicle and an inner face intended to be turned towards the inside of the vehicle, the translucent body being made of a partially opaque material being arranged to let the light emitted by the light system pass through the translucent body when the light system is turned on, the partially opaque material having a light transmittance chosen so that the quantity of natural light passing through the translucent body, reflecting on the light system and passing back through the translucent body is sufficiently low to blank the light system when the light system is switched off, the translucent body being made of thermoplastic material comprising a colored pigment, the quantity of pigment being chosen for reaching a determined light transmittance, the translucent body having a determined light transmittance ranged from 10% to 60% of visible light spectra ranged from 400 nm to 800 nm, preferably a light transmittance equal at 30%, the translucent body being integrally molded by injection, providing a holder body, the holder body being intended to sustain the translucent body to the vehicle, forming an enclosure between the holder body and the translucent body, attaching a light system facing to an inner face of the translucent body, the light system extending in the enclosure, adapted to diffuse light through the translucent body, attaching the translucent body to the holder body, providing a covering body and attached the covering body in part on an outer face of the translucent body, so as to form a coherent extension body with the vehicle.

Figure 2:
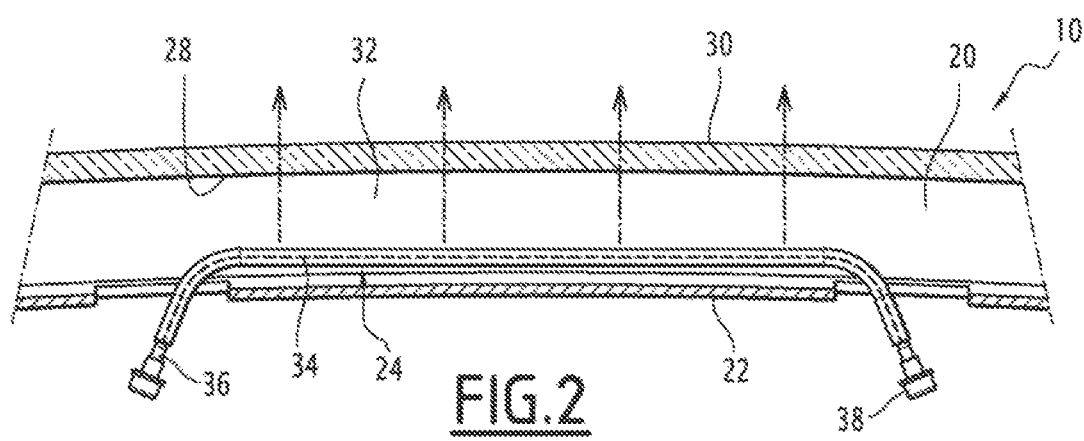
Figure 3:
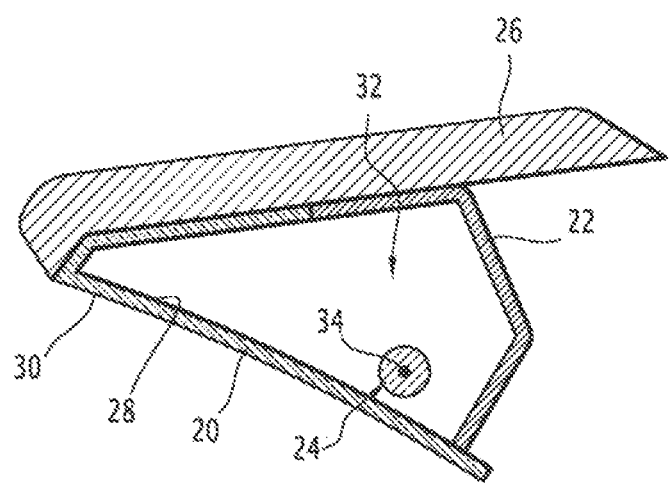
Figure 4:
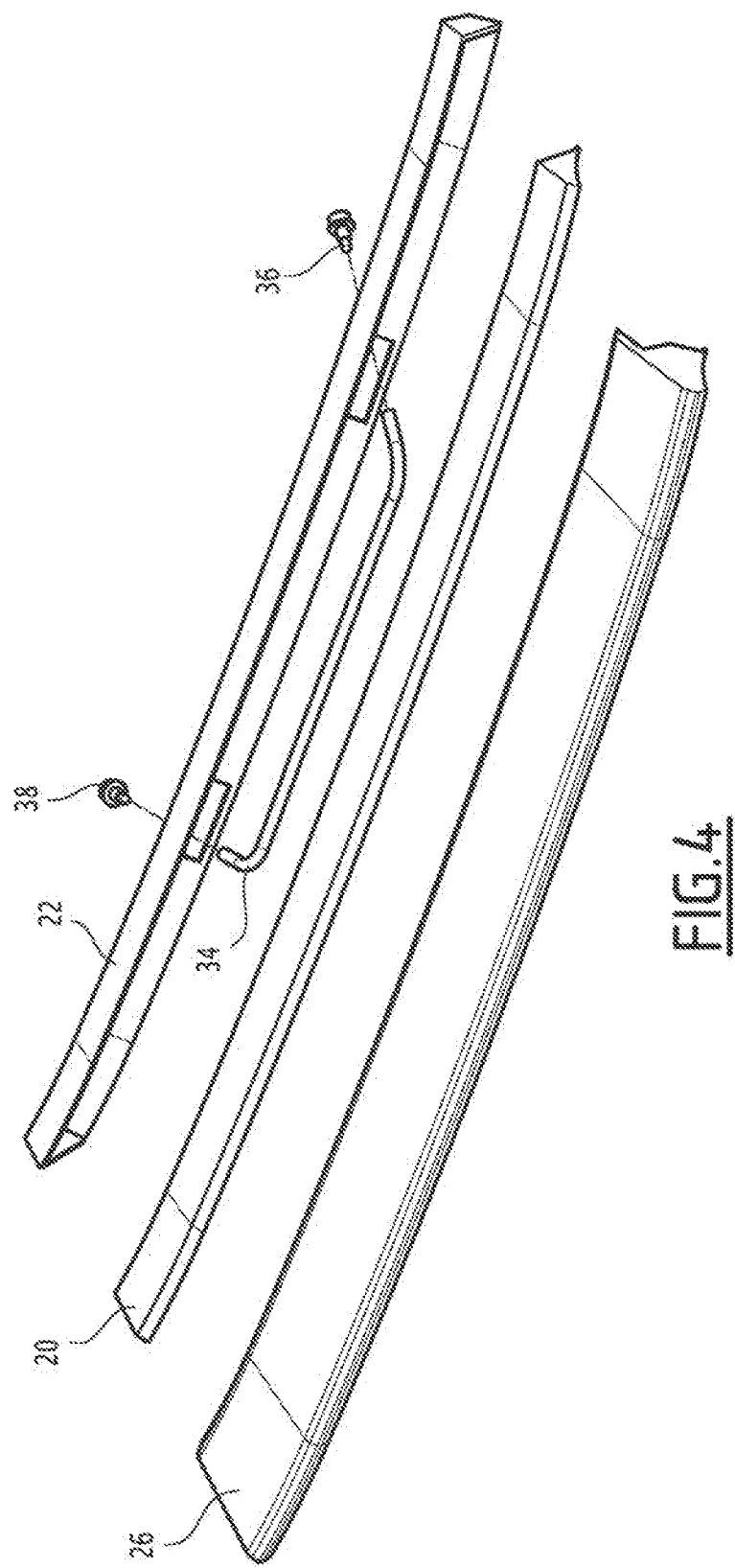

Other aspects and advantages of the invention will appear upon reading the following description, given by way of example and made in reference to the appended drawings, wherein:

FIG. 1 is a diagrammatical and partially cross-section view of part of a state-of-art body element, FIG. 2 is a diagrammatical and partially cross-section view of part of a body element of the invention, FIG. 3 is a diagrammatical perspective cross-section view of part of the body element of the invention, and FIG. 4 is a diagrammatical perspective view of the different part of the body element of the invention.

Referring to FIGS. 1 and 2, a vehicle body element 10 will be described.

By vehicle, it is meant any carriage, such as passenger car or truck or other.

By body element, it is meant any element intended to extend toward the outside of the vehicle, such as a trim element, a decoration element of the decorative cover, a spoiler, a tailgate, a stop light, other lights or other.

By light transmittance, it is meant the fraction of incident light at a specified wavelength, here visible wavelength, that passes through a sample.

A state-of-art body element 10 has been illustrated in FIG. 1.

Referring to FIG. 1, the body element 10 comprises a light module 12 arranged in an opening 14.

The light module includes a transparent cover 18. The transparent cover 18 is usually colored, reflective and visible from outside of the vehicle when the LED source 16 is turned off.

Referring to FIG. 2, the body element 10 comprises a translucent body 20, a holder body 22 and a light system 24. Referring to FIG. 3, the body element 10 preferably further comprises a covering body 26.

The translucent body 20 comprises an inner face 28, intended to be turned towards the inside of the vehicle, and an outer face 30, intended to be turned towards the outside of the vehicle, i.e. to extend outside the vehicle and to be visible from the outside of the vehicle.

The translucent body 20 extends at least facing to the light system 24.

The translucent body 20 has a constant thickness, including next to the light system 24. The thickness of the translucent body is substantially equal at any point of the translucent body 20. Substantially equal means that the thickness of the translucent body at any point is comprised between 90% and 110% of the average thickness of the translucent body 20.

The thickness is the dimension of the translucent body 20 measured perpendicularly to the outer face 30.

The constant thickness enables a constant light diffusion and a constant light intensity on the outer face 30. The outer face 30 has thereby a constant appearance of the outer face 30.

From the outside of the vehicle, the outer face 30 is without opening, as shown in FIG. 2. The translucent body 20 has the desired shape of the body element 10 to provide. In other words, the translucent body 20 defines the whole visible surface of the body element 10, at least in a given direction, for example the rear direction.

The translucent body 20 is made of a single layer made of a translucent or transparent thermoplastic material without any light-scattering surface layer coated thereon. The translucent body 20 is integrally molded by injection. The translucent body 20 is coated advantageously with at least one wear resistant coating, the coating having no effect on the light diffusion.

As the body is made in a translucent or transparent material, the material allows light to pass from the inner face 28 to the outer face 30 and vice-versa.

To let the light emitted by the light system 24 passes through the translucent body 20 when the light system 24 is turned on, the translucent body 20 is made of a partially opaque material.

The partially opaque material is defined according to a light transmittance chosen. In other words, the partially opaque material is determined to reach a sufficient opacity level in order to hide the light system 24.

The light transmittance is determined to let a quantity of natural light passing through the translucent body 20, reflecting on the light system 24 and passing back through the translucent body. The quantity of natural light passing back through the translucent body 20 is sufficiently low to blank the light system 24 when the light system 24 is switched off.

To make the partially opaque material, the translucent body 20 is, for example, made of one or more translucent thermoplastic materials comprising a colored pigment. The quantity of pigment introduced in the translucent thermoplastic materials is chosen to reach the determined light transmittance.

Indeed, the quantity of pigment modifies the light transmittance of the translucent thermoplastic materials.

To reach a light transmittance allowing to blank the light system 24 when the light system 24 is switched off and allowing to let the light to pass from the turned on light through the translucent body 20, the light transmittance of the translucent body 20 is ranged from 10% to 60% of visible light spectra ranged from 400 nm to 800 nm. Preferably, the light transmittance is equal to 30% of a visible wavelength.

So that to produce the partially opaque material, the determined light transmittance is only reached by adjusting the quantity of pigments into the thermoplastic material.

The thermoplastic material is made of one or more translucent thermoplastic materials, such as polymethyl methacrylate (PMMA), polycarbonate (PC), polymethyl methacrylate-acrylonitrile-styrene-acrylate terpolymer (PMMA-ASA) or other or a mix of these materials. The material is chosen depending on the mechanical and optical performance required by the intended application.

The pigment is from an inorganic or organic nature.

Referring to FIGS. 2 and 3, the translucent body 20 is sustained to the vehicle by the holder body 22.

Referring to FIG. 4, the holder body 22 has the desired shape, adapted to the translucent body 20 shape. Jointly, the holder body 22 and the translucent body 20 provide the desired shape of the body element 10.

To join them, the holder body 22 comprises, for example, fastening points to attach the translucent body 20 by clipping or gluing or other fastening technique.

Furthermore, the holder body 22 defines an enclosure with the translucent body.

Referring to FIGS. 3 and 4, the light system 24 extends in the enclosure 32. The light system 24 is arranged facing the inner face 28 of the translucent body 20. The light system 24 is adapted to diffuse light through the translucent body 20, being facing to the inner face 28.

The light system 24 is, for example, formed by at least one light guide 34, for example of the optic fibre type, and by at least one light source 36, for example of the light-emitting diode, connected to at least one of the extreme part of the light guide 34. The light system 24 comprises also a powering electronics 38.

The light guide 34 is arranged to emit light coming from the light system 24 towards the outer face 30 of the translucent body, as shown by ray in FIG. 2.

Furthermore, the light system 24 is designed to emit the light towards a determined direction, so that the light crosses directly the translucent body 20, along the said direction, without be significantly deviated.

So that the light system 24 is visible through the translucent body 20 when the light system is turned on, the light system 24, shown in FIG. 2, has a higher light output than the LED source 16 shown in FIG. 1. To pass through the partially opaque translucent body 20, the light output is preferably 50% higher than a LED source 16 with the transparent cover 18. It has preferably a light output in the range between 1 to 1000 cd.

Referring to FIG. 3, the light guide 34 is for example glued to inner face 28 of the translucent body or welded thereto and extends along a path defining a pattern to be lighted on the outer face 30 of the body element. The light source 36 and its powering electronics 38 can also be attached to the inner face 28 of the translucent body. Moreover, the light guide is for example glued to the holder body 22 facing to the inner face 28.

The pattern can have any desired shape, from a simple straight line, as shown in FIG. 3, or a curve or else. Several light guides 34 can be provided to create the pattern.

Consequently, when the light system 24 is turned on, the light emitted through the translucent body 20 to the outer face 30 is emitted towards the outside of the body element, which gives a particular aspect to the vehicle.

In alternative, one or more light sources 34 are extends in the enclosure 32, facing the inner face 28 of the translucent body 20 without any light guide 34.

Referring to FIG. 3, the covering body 26 extends in part on the outer face 30 of the translucent body, form a coherent extension body with the vehicle.

The covering body 26 extends on the body element 10 or between body elements of the vehicle to realize a material junction.

Furthermore, the covering body 26 location on the outer face 30 of the translucent body is adapted to cover the parts where the concentration of natural light is the highest. The covering body 26 shape forms a shadow area, for example, according to the inclination of the natural light.

The covering body 26 is made of a metallic or plastic sheet conformed to the aesthetic aspect of the body element.

Referring to FIG. 4, the method for producing the body element 1 will now be described.

A holder body 22 having the desired shape of the body element 10 is first provided.

Then, a body made of translucent or transparent material having the desired shape of the body element 10 and a complementary shape of the holder body 22, is provided.

The light system 24 is attached, for example by gluing or else, to the holder body 22.

In alternative, the light system 24 is attached by a fastening technique, to the inner face 28 of the translucent body 20. According to an embodiment, the light system 24 can also be attached to the translucent body 20 before or during one of the steps described previously.

The translucent body 20 is attached to the holder body 22, for example, by clipping or gluing.

Furthermore, a covering body 26 is provided and attached on a part of the outer face 30 of the translucent body.

Consequently, from outside the body element 10, an observer only sees the uniform translucent body and does not perceive the presence of elements behind the translucent body or the presence of the pattern designed by the light system 24, when the body element 10 is illuminated by natural light.

The body element 10 according to the embodiments described above allows providing lightings on the outer face 30 of a vehicle without the light guides 34 being visible when the light system 24 is turned off. When the light system 24 is turned on, the lighting appears on the outer face 30 of the body element.

A body element 10 having an improved appearance is thereby obtained. The lighting can be a decorative lighting, for example when the body element 10 forms a door rod, or a functional lighting, for example when the body element 10 extends in the area provided for breaking lights.

Furthermore, the method for producing the body element 10 is simplified, without having to put the light system 24 in an opening 14. The step of attaching the light system 24 is realized during the step of providing the transparent body 20 or the holder body 22.

The invention claimed is:

1. Vehicle body element, comprising:
a translucent body having an outer face intended to be turned towards the outside of the vehicle and an inner face intended to be turned towards the inside of the vehicle,
a holder body intended to sustain the translucent body to the vehicle, forming an enclosure between the holder body and the translucent body, and
a light system extending in the enclosure, adapted to diffuse light through the translucent body,
wherein the translucent body has a constant thickness and the translucent body is made of a partially opaque material being arranged to let the light emitted by the light system pass through the translucent body when the light system is turned on, the partially opaque material having a light transmittance chosen so that a quantity of natural light passing through the translucent body, reflecting on the light system and passing back through the translucent body is sufficiently low to blank the light system when the light system is switched off,
and wherein the translucent body is made of thermoplastic material comprising a colored pigment, a quantity of pigment being chosen for reaching a determined light transmittance,
the body element further comprising a covering body extending in part on the outer face of the translucent body so as to form a coherent extension body with the vehicle, the covering body location on the outer face of the translucent body being adapted to cover parts of the translucent body where a concentration of natural light is highest.

2. Body element according to claim 1, wherein the translucent body has a light transmittance ranged from 10% to 60% of visible light spectra ranged from 400 nm to 800 nm.

3. Body element according to claim 1, wherein the translucent body is integrally molded by injection.

4. Body element according to claim 1, wherein the translucent body is made of a single layer made of the thermoplastic material, loaded with pigments, without any light-scattering surface layer coated thereon, for modifying the light transmittance of at least a part of the translucent body facing the light system.

5. Body element according to claim 1, wherein the light transmittance of the thermoplastic material is determined by the quantity of pigment in the thermoplastic material.

6. Body element according to claim 1, wherein the thermoplastic material is made of one or more translucent thermoplastic materials, the translucent thermoplastic materials being chosen from polymethyl methacrylate (PMMA), polycarbonate (PC), polymethyl methacrylate- acrylonitrile- styrene-acrylate terpolymer (PMMA-ASA) or a mix of these materials.

7. Body element according to claim 1, wherein the light system comprises at least one light guide or at least one light source.

8. Body element according to claim 1, wherein the light system has a light output between 1 to 1000 cd.

9. Body element according to claim 1, wherein the light system is designed to emit the light towards a determined direction, so that the light crosses directly the translucent body, along the said direction without being significantly deviated.

10. Method for producing a body element according to claim 1, wherein said method comprises the following steps:
   providing a translucent body, the translucent body having an outer face intended to be turned towards the outside of the vehicle and an inner face intended to be turned towards the inside of the vehicle, the translucent body having a constant thickness, the translucent body being made of a partially opaque material being arranged to let the light emitted by the light system pass through the translucent body when the light system is turned on, the partially opaque material having a light transmittance chosen so that the quantity of natural light passing through the translucent body, reflecting on the light system and passing back through the translucent body is sufficiently low to blank the light system when the light system is switched off, the translucent body being made of thermoplastic material comprising a colored pigment, the quantity of pigment being chosen for reaching a determined light transmittance, the translucent body having a determined light transmittance ranged from 10% to 60% of visible light spectra ranged from 400 nm to 800 nm, the translucent body being integrally molded by injection,
   providing a holder body, the holder body being intended to sustain the translucent body to the vehicle, forming an enclosure between the holder body and the translucent body,
   attaching a light system facing to the inner face of the translucent body, the light system extending in the enclosure, adapted to diffuse light through the translucent body,
   attaching the translucent body to the holder body,
   providing a covering body and attaching the covering body in part on the outer face of the translucent body, so as to form a coherent extension body with the vehicle, the covering body location on the outer face of the translucent body being adapted to cover parts of the translucent body where a concentration of natural light is highest.

11. Body element according to claim 2, wherein the translucent body has a light transmittance equal to 30% of visible light spectra ranged from 400 nm to 800 nm.

* * * * *